(12) United States Patent
Meier et al.

(10) Patent No.: US 8,371,780 B2
(45) Date of Patent: Feb. 12, 2013

(54) ROTATIONALLY DRIVABLE CUTTING OR MILLING TOOL AND METHOD, AND USE OF SUCH A CUTTING TOOL FOR PRODUCING DRIVING AND CONVEYOR BELTS

(75) Inventors: Frank Meier, Beverungen (DE); Ulrich Ballhausen, Bad Driburg (DE)

(73) Assignee: Arntz Beteiligungs GmbH & Co. KG, Höxter (DE)

( * ) Notice: Subject to any disclaimer, the term of this patent is extended or adjusted under 35 U.S.C. 154(b) by 1065 days.

(21) Appl. No.: 12/280,553

(22) PCT Filed: Feb. 13, 2007

(86) PCT No.: PCT/DE2007/000258
§ 371 (c)(1),
(2), (4) Date: Jan. 15, 2009

(87) PCT Pub. No.: WO2007/095897
PCT Pub. Date: Aug. 30, 2007

(65) Prior Publication Data
US 2010/0021255 A1 Jan. 28, 2010

(30) Foreign Application Priority Data
Feb. 24, 2006 (DE) .......................... 10 2006 009 203

(51) Int. Cl.
*B23C 3/00* (2006.01)
*B26D 1/12* (2006.01)

(52) U.S. Cl. .............................. 409/132; 407/60; 407/61

(58) Field of Classification Search .................. 409/132; 407/31, 60, 61, 30, 56, 113
See application file for complete search history.

(56) References Cited

U.S. PATENT DOCUMENTS

| | | | | |
|---|---|---|---|---|
| 2,914,838 A | * | 12/1959 | Robinson | 407/47 |
| 3,495,483 A | * | 2/1970 | Janik | 408/211 |
| 3,576,200 A | * | 4/1971 | Elmes | 83/848 |
| 3,927,447 A | | 12/1975 | Willinger | |
| 4,766,789 A | * | 8/1988 | Sayer | 82/47 |
| 5,755,538 A | * | 5/1998 | Heule | 408/154 |
| 7,278,806 B1 | * | 10/2007 | Clayton | 409/140 |
| 2002/0029661 A1 | | 3/2002 | Yamazaki | |

FOREIGN PATENT DOCUMENTS

| | | |
|---|---|---|
| DE | 4115095 A1 | 11/1992 |
| EP | 0050173 A1 | 4/1982 |
| EP | 0642886 A1 | 3/1995 |
| GB | 550 077 A | 12/1942 |
| JP | 2000246529 A | 9/2000 |
| JP | 2002326117 A | 11/2002 |

* cited by examiner

*Primary Examiner* — Edward Tolan
(74) *Attorney, Agent, or Firm* — Gudrun E. Huckett

(57) ABSTRACT

A rotationally drivable cutting or milling tool has at least one first cutting tooth effective in a first rotational direction and at least one second cutting tooth effective in a second rotational direction opposite to the first rotational direction. The at least one first cutting tooth and the at least one second cutting tooth have differently oriented cutting edges for performing different machining steps in the first and second rotational directions, respectively.

6 Claims, 2 Drawing Sheets

ROTATIONALLY DRIVABLE CUTTING OR MILLING TOOL AND METHOD, AND USE OF SUCH A CUTTING TOOL FOR PRODUCING DRIVING AND CONVEYOR BELTS

BACKGROUND OF THE INVENTION

The invention concerns a rotationally driveable cutting or milling tool comprising at least one tooth effective in the first rotational direction and at least one cutting tooth effective in the second rotational direction.

In a rotationally drivable milling tool of this kind disclosed in DE 41 15 095 A1 all of the cutting edges have the same spacing relative to the axis of rotation and this milling tool is designed such that it can be used in the same way in both rotational directions. With such a milling tool the task is to be solved to be able to select freely the cutting or rotational direction of the tool body without this requiring complex changes of the cutting tool or other manipulations, wherein in each cutting direction an excellent cutting result is to be obtained. In this way it is made possible that the chips are always discharged in the same direction wherein the milling tool depending on the machining sequence can perform milling work during infeed as well as return stroke without the quality of the machined surfaces suffering.

EP 0 050 173 B1 of the company MITSUBOSHI BELTING Ltd., which reference is dating back to the year 1980, discloses a method for cutting or milling grooves of ribbed belts. In this method a rotationally drivable cutting or milling tool is used that comprises on a common axis several adjacently arranged cutting or milling disks provided at their circumference with cutting edges that are effective in the rotational direction of milling the grooves.

A similar tool is disclosed in 0 642 886 A1 dating back to the year 1994 and also assigned to the company MITSUBOSHI BELTING Ltd.

When cutting or milling edges and/or grooves of drive belts or conveying belts, in particular when manufacturing V-belts, V-ribbed belts, ribbed belts, tooth belts, flat belts or the like that generally are comprised of a tough or elastic material, the formation of tiny flaps or tiny tabs is observed that must be removed by a subsequent machining step. This problem however is also observed generally in machining processes in which in general rubber or rubberlike materials are processed by cutting or milling.

It is an object of the invention to provide, with respect to the machine as well as with respect to the method, in the manufacture of in particular V-belts and V-ribbed belts and the like a simplification during cutting or milling of the belt edges or the belt grooves in particular with respect to the problem of the tiny tabs or tiny flaps that are formed during edge or groove milling.

SUMMARY OF THE INVENTION

This object is solved with a cutting or milling tool comprising at least one cutting tooth effective in the first rotational direction and at least one cutting tooth effective in the second rotational direction, characterized in that the cutting teeth effective in the opposite rotational directions for performing different machining steps have differently oriented cutting edges, and in a corresponding manner with a method that employs a cutting or milling tool as set forth above.

The milling tool according to the invention differs from the milling tool described in DE 41 15 095 A1 that can be used in both rotational directions in the same way in that the cutting teeth that are effective in the opposite rotational directions have differently oriented cutting edges so that in the oppositely oriented rotational directions different machining processes are possible. By driving the cutting tool in the first rotational direction, that can be referred to as the main rotational direction, when producing e.g. V-belts, V-ribbed belts and the like, for example, in a first processing step, the actual main processing step, milling or cutting of the edges or grooves is performed while for driving the cutting tool in the opposite direction a processing step that is completely different can be performed, i.e., cutting off or milling off the tiny flaps or tiny tabs that have been created during the first processing step.

In the manufacture or machining of endless belts, in particular V-belts, V-ribbed belts, ribbed belts, tooth belts, flat belts of the like, generally an outer belt cover layer of rubber or rubber-like material, a carcass layer, and a base layer of rubber or rubber-like material are laminated about a drum in order to define a substantially hose-shaped belt wall that is vulcanized. The belt wall is subsequently pulled on a tensioning drum and is machined by an especially sawtooth-like milling or grinding tool that acts on the base cover layer positioned externally relative to the tensioning drum in order to cut or mill grooves into the belt wall whose configuration in the manufacture of V-belts or V-ribbed belts is complementary to the configuration of the individual grooves. In particular when cutting or milling the V-shaped groove or slot of V-belts or V-ribbed belts that are open at their flanks, the aforementioned tiny tabs or tiny flaps are formed that, in accordance with the teaching of the present invention, can now be removed in a simplified way in that the cutting or milling tool that on its circumference is provided with cutting edges that are effective in opposite rotational directions is driven opposite to the rotational direction for cutting or milling of the slots or grooves that can be referred to as the main rotational direction of the tool.

Preferred embodiments are disclosed in the dependant claims.

The invention will be explained in the following with reference to the attached drawing in more detail.

DESCRIPTION OF PREFERRED EMBODIMENTS

Figure 1:
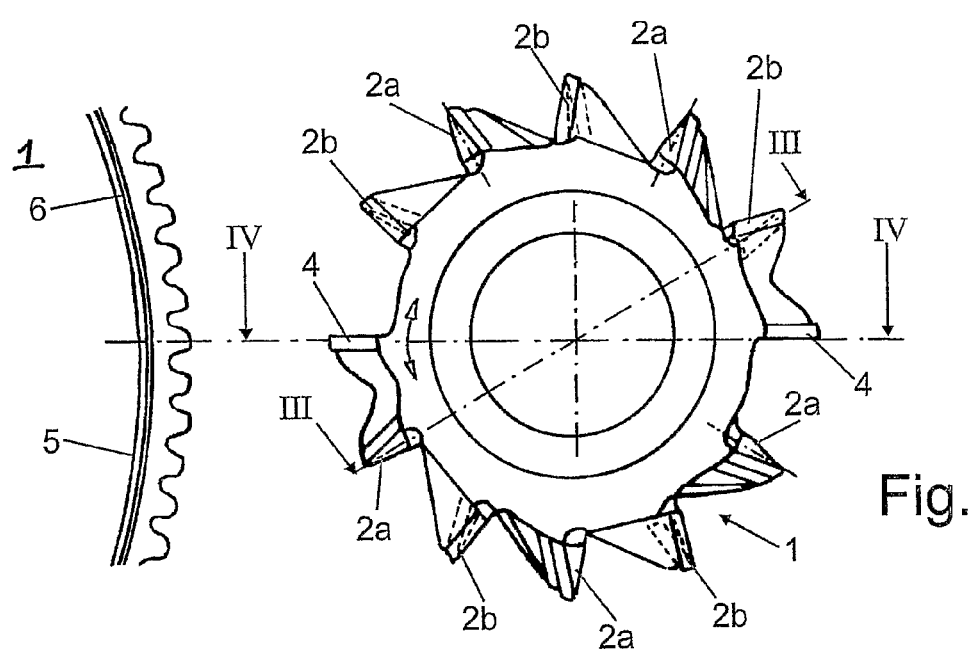
FIG. 1 shows a side view of the cutting or milling tool embodied as a cutting or milling disk in correlation with a hose-shaped belt wall wound onto a tensioning drum.
Figure 3:
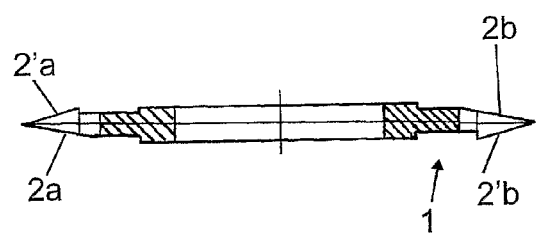
FIG. 3 is a section view according to line III-III in FIG. 1.
Figure 4:
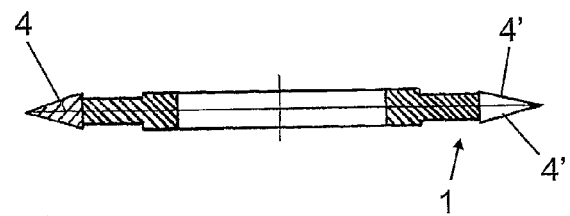
FIG. 4 is a section view according to line IV-IV in FIG. 1.

The cutting or milling disk illustrated in FIGS. 1, 3, and 4 has several cutting teeth 2a and 2b distributed about its circumference and provided with slantedly positioned cutting surfaces, respectively, wherein the cutting edges 2'a and 2'b are alternatingly embodied only on one side. These cutting teeth 2a and 2b form a first group for cutting or milling V-grooves or V-flanks of V-belts or V-ribbed belts. The cutting or milling disk 1 comprises according to the invention additionally e.g. two diametrically opposed cutting teeth 4 with axially oriented cutting surfaces and cutting edges 4' that are positioned on opposite faces of the cutting or milling disk 1.

When driving the cutting or milling disk 1 in the main rotational direction, i.e., relative to FIG. 1 in the counter-clockwise direction, the cutting teeth 2a and 2b are effective for producing the V-flanks. When driving the disk 1 in the clockwise direction the cutting teeth 4 are effective for removing the tiny flaps or tiny tabs that have been produced during the first machining step.

Figure 5:
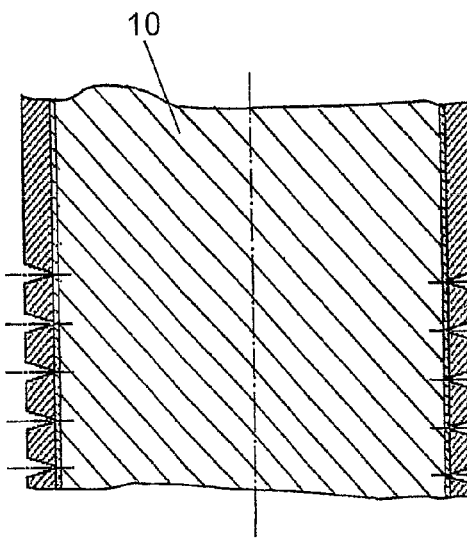
FIG. 5 shows schematically a cutting tool with several adjacently positioned individual tools for simultaneous cutting or milling and subsequent after-processing of several adjacently positioned V-ribs.
Figure 5:
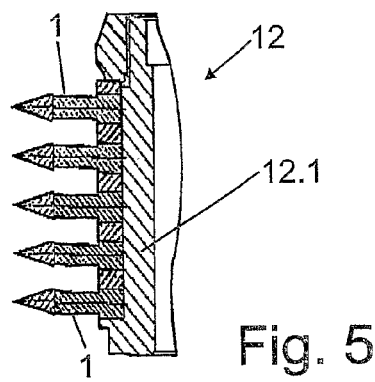

FIG. 5 shows a belt wall 11a, wound onto a tensioning drum 10 and partially not yet machined, and also shows a partially already milled V-ribbed belt 11 that has been machined by a tool 12 that has several, as illustrated e.g. five, axially adjacently positioned cutting or milling disks 1 each being configured with cutting teeth in accordance to the cutting teeth 2a, 2b, and 4 according to the cutting disk 1 illustrated in FIGS. 1, 3, and 4. The cutting or milling disks 1 are clamped onto a tool support sleeve 12.1.

Figure 2:
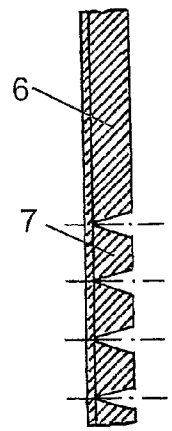
FIG. 2 shows a detail in cross-section of a belt wall or belt coil.

FIG. 3 shows the cutting or milling disk 1 according to the invention in correlation to a belt wall 6 wound onto a tensioning drum. FIG. 2 shows this belt wall 6 before and after machining of individual V-belts or V-ribs 7.

Aside from the method in accordance with claim 9 the invention concerns also the use according to claim 7 which use is not known in the prior art.

The invention concerns also the use of a rotationally drivable cutting tool with cutting teeth arranged about its circumference, wherein each one of the cutting teeth effective in the first rotational direction has (in the rotational direction) a slantedly positioned cutting surface 2'a and 2'b while each cutting tooth 4 effective in the opposite rotational direction has an axially oriented cutting surface 4', for milling edges and/or grooves in the manufacture of drive belts or conveying belts, in particular in the manufacture of V-belts, V-ribbed belts, ribbed belts, tooth belts, flat belts or the like, wherein each cutting tooth with slantedly positioned cutting surface in the rotational direction is effective in a first working step for milling the edges and/or grooves while each cutting tooth with axially oriented cutting surface 4' is effective in a subsequent working step for removing tiny flaps or tiny tabs produced during the first working step.

What is claimed is:

1. Rotationally drivable cutting or milling tool comprising:
    at least one first cutting tooth effective in a first rotational direction and at least one second cutting tooth effective in a second rotational direction opposite to the first rotational direction;
    wherein the at least one first cutting tooth has a first cutting edge and the at least one second cutting tooth has a second cutting edge, wherein the first cutting edge has a first orientation relative to the first rotational direction and the second cutting edge has a second orientation relative to the second rotational direction that is different from the first orientation so that the first and second cutting edges perform different machining steps in the first and second rotational directions, respectively;
    wherein the first and second orientations differ in that the at least one first cutting tooth has a slantedly positioned cutting surface relative to the first rotational direction and the at least one second cutting tooth has an axially oriented cutting surface relative to the second rotational direction.

2. Cutting or milling tool according to claim 1, wherein the at least one second cutting tooth has two cutting edges that are positioned on axially opposed faces of the tool that is embodied as a disk.

3. Cutting or milling tool according to claim 2, wherein two of the at least one second cutting tooth are provided diametrically opposed to one another.

4. Cutting or milling tool according to claim 2, wherein the at least one second cutting tooth has an axially oriented cutting surface with cutting edges effective on both of the axially opposed faces.

5. Cutting or milling tool according to claim 1, wherein several of the at least one first cutting tooth are provided and wherein the slantedly positioned cutting surfaces of said several first cutting teeth are arranged alternatingly on opposite sides of said several cutting teeth in the first rotational direction.

6. Method for milling edges and grooves for producing drive belts or conveying belts, wherein a rotationally drivable cutting or milling tool according to claim 1 is used, wherein the at least one first cutting tooth and the at least one second cutting tooth are arranged on a circumference of the cutting or milling tool, wherein the at least one first cutting tooth has a slantedly positioned cutting surface and wherein the at least one second cutting tooth has an axially oriented cutting surface, the method comprising:
    in a first working step, producing, by rotating the cutting or milling tool in the first rotational direction, edges and/or grooves in a be wall by milling with the at least one first cutting tooth; and
    in a second working step, removing, by rotating the cutting or milling tool in the second rotational direction, with the at least one second cutting tooth tiny flaps or tiny tabs produced during the first working step.

* * * * *